(12) United States Patent
Jiang et al.

(10) Patent No.: US 8,268,407 B2
(45) Date of Patent: Sep. 18, 2012

(54) METHOD FOR MANUFACTURING A PERPENDICULAR MAGNETIC WRITE HEAD HAVING WRITE POLE

(75) Inventors: Ming Jiang, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 1045 days.

(21) Appl. No.: 12/206,625

(22) Filed: Sep. 8, 2008

(65) Prior Publication Data
US 2010/0062177 A1 Mar. 11, 2010

(51) Int. Cl.
*B05D 3/00* (2006.01)
*G11B 5/127* (2006.01)

(52) U.S. Cl. .................................. 427/551; 360/110
(58) Field of Classification Search .................. 427/551; 360/110
See application file for complete search history.

(56) References Cited

U.S. PATENT DOCUMENTS

| 5,168,409 A | 12/1992 | Koyama et al. ............... 360/113 |
| 5,173,821 A | 12/1992 | Maloney ....................... 360/119 |
| 6,081,408 A | 6/2000 | Partee ............................ 360/113 |
| 2003/0016470 A1* | 1/2003 | Minor et al. ................... 360/125 |
| 2004/0047079 A1 | 3/2004 | Ito et al. ........................ 360/317 |
| 2007/0230045 A1 | 10/2007 | Hsiao et al. ................... 360/126 |
| 2008/0100959 A1* | 5/2008 | Feldbaum et al. ............ 360/110 |

* cited by examiner

*Primary Examiner* — Jessee R. Roe
(74) *Attorney, Agent, or Firm* — Zilka-Kotab, PC

(57) ABSTRACT

A method for manufacturing a write head having write pole with a tapered upper surface to improve the channeling of magnetic flux to a pole tip of the write pole. The method includes depositing a first layer of magnetic material over a substrate. A CMP stop layer, image transfer layer and mask structure are deposited over the first magnetic layer, the mask structure being formed with an edge located a desired distance from an air bearing surface plane. An ion milling operation is performed to remove portions of the magnetic layer that are not protected by the mask structure, the ion milling being performed in a manner to form a tapered surface on the first magnetic layer. Then, a second magnetic layer is deposited over the first magnetic layer to form a tapered magnetic write pole.

22 Claims, 18 Drawing Sheets

METHOD FOR MANUFACTURING A PERPENDICULAR MAGNETIC WRITE HEAD HAVING WRITE POLE

FIELD OF THE INVENTION

The present invention relates to perpendicular magnetic recording and more particularly to a magnetic write head having a write pole with a slanted portion for improved magnetic core width control and improved write field.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

SUMMARY OF THE INVENTION

The present invention provides a method for manufacturing a magnetic write head having a tapered write pole. The method includes providing a substrate, and depositing a first magnetic layer over the substrate. A CMP stop layer is deposited over the first magnetic layer and a mask structure is formed over the CMP stop layer. An ion milling process is performed to remove portions of the first magnetic layer and is performed in a manner so as to form a tapered surface on the first magnetic layer. A RIEable material is then deposited and a chemical mechanical polishing process (CMP) is performed. A reactive ion etching (RIE) is performed to remove the RIEable material and any remaining CMP stop layer. Then, a second layer of magnetic material is deposited over the first magnetic layer and a portion of the substrate to form a tapered write pole.

The tapered shape of the resulting write pole advantageously improves writer performance, improving the ratio of magnetic core width MWWW/MCW. Overwrite performance is also improved, and field gradient is increased by 5 to 10 percent.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
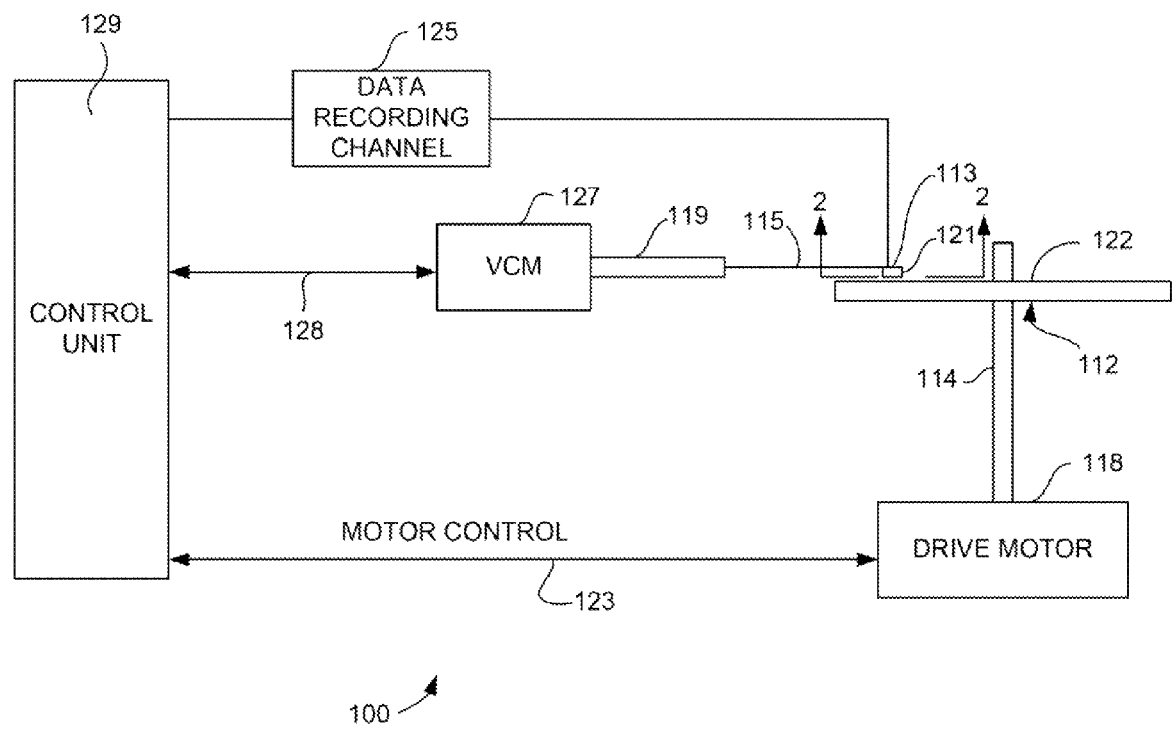
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
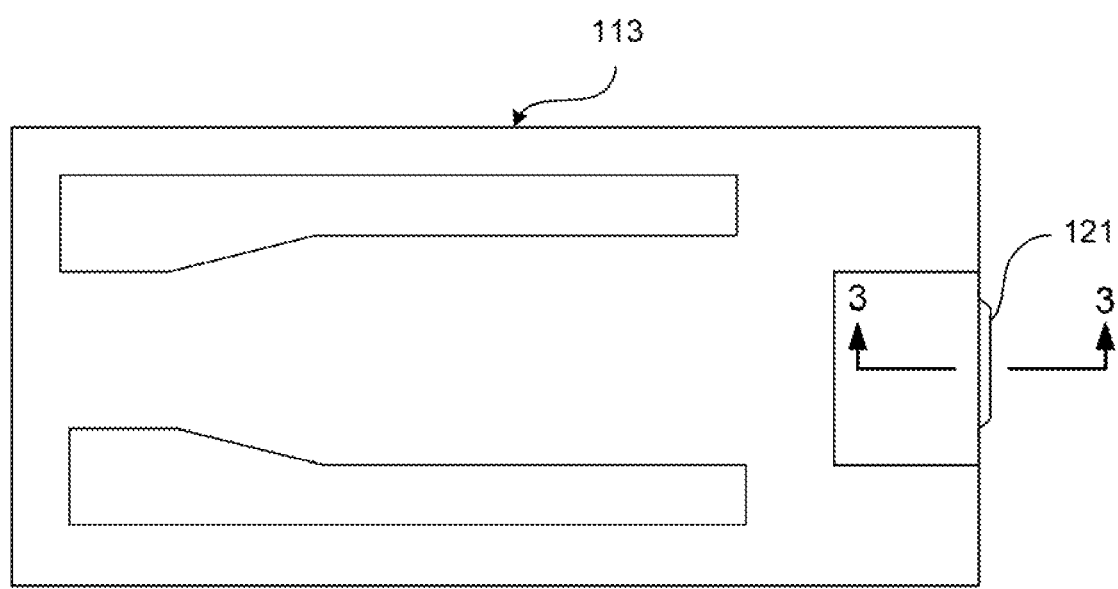
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
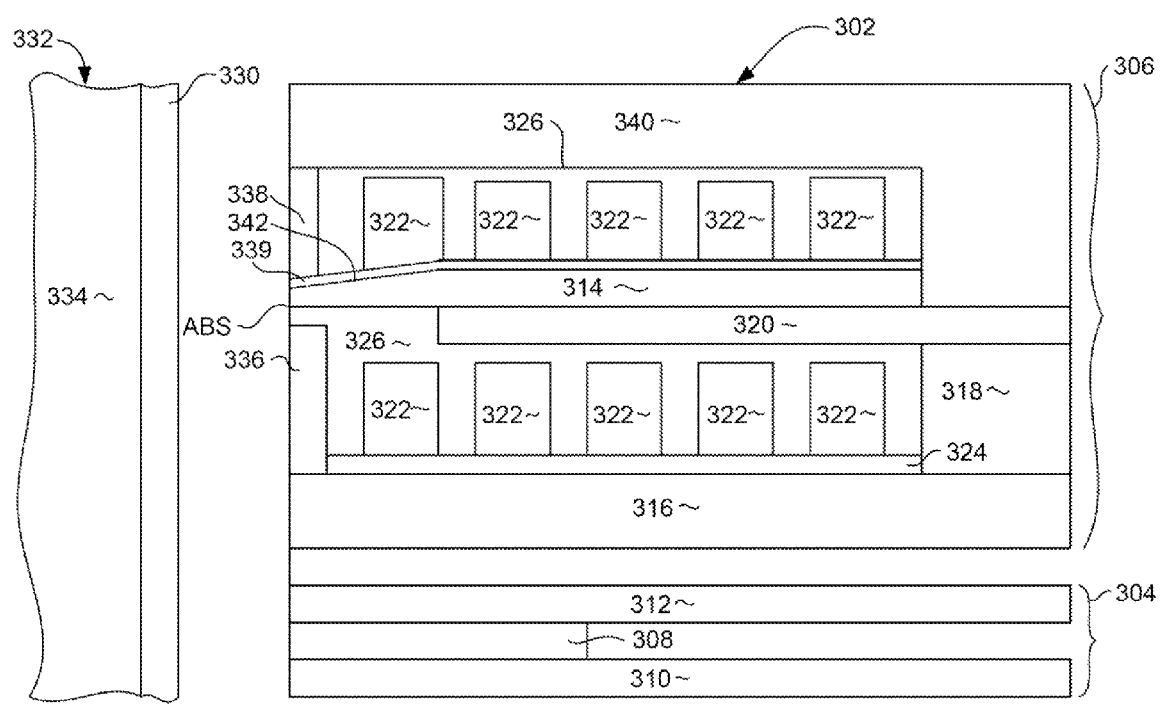
FIG. 3 is a cross sectional view of a magnetic head, taken from line 3-3 of FIG. 2 and rotated 90 degrees counterclockwise, of a magnetic write head according to an embodiment of the present invention.

With reference now to FIG. 3, the invention can be embodied in a magnetic head 302. The magnetic head 302 includes a read head 304 and a write head 306. The read head 304 includes a magnetoresistive sensor 308, which can be a GMR, TMR, or some other type of sensor. The magnetoresistive sensor 308 is located between first and second magnetic shields 310, 312.

The write head 306 includes a magnetic write pole 314 and a magnetic return pole 316. The write pole 314 can be formed upon a magnetic shaping layer 320, and a magnetic back gap layer 318 magnetically connects the write pole 314 and shaping layer 320 with the return pole 316 in a region removed from the air bearing surface (ABS). A write coil 322 (shown in cross section in FIG. 3) passes between the write pole and shaping layer 314, 320 and the return pole 316, and may also pass above the write pole 314 and shaping layer 320. The write coil 322 can be a helical coil or can be one or more pancake coils. The write coil 322 can be formed upon an insulation layer 324 and can be embedded in a coil insulation layer 326 such as alumina and or hard baked photoresist.

In operation, when an electrical current flows through the write coil 322. A resulting magnetic field causes a magnetic flux to flow through the return pole 316, back gap 318, shaping layer 320 and write pole 314. This causes a magnetic write field to be emitted from the tip of the write pole 314 toward a magnetic medium 332. The write pole 314 has a cross section at the ABS that is much smaller than the cross section of the return pole 316 at the ABS. Therefore, the magnetic field emitting from the write pole 314 is sufficiently dense and strong that it can write a data bit to a magnetically hard top layer 330 of the magnetic medium 332. The magnetic flux then flows through a magnetically softer under-layer 334, and returns back to the return pole 316, where it is sufficiently spread out and weak that it does not erase the data bit recorded by the write head 314. A magnetic pedestal 336 may be provided at the air bearing surface ABS and attached to the return pole 316 to prevent stray magnetic fields from the bottom leads of the write coil 322 from affecting the magnetic signal recorded to the medium 332.

In order to increase write field gradient, and therefore increase the speed with which the write head 306 can write data, a trailing, wrap-around magnetic shield 338 can be provided. The trailing, wrap-around magnetic shield 338 is separated from the write pole by a non-magnetic layer 339, and may be connected with the shaping layer 320 and/or back gap 318 by a trailing return pole 340. The trailing shield 338 attracts the magnetic field from the write pole 314, which slightly cants the angle of the magnetic field emitting from the write pole 314. This canting of the write field increases the speed with which write field polarity can be switched by increasing the field gradient. A trailing magnetic return pole 340 is provided and can be magnetically connected with the trailing shield 338. Therefore, the trailing return pole 340 can magnetically connect the trailing magnetic shield 338 with the back portion of the write pole 302, such with the back end of the shaping layer 320 and with the back gap layer 318. The magnetic trailing shield is also a second return pole so that in addition to magnetic flux being conducted through the medium 332 to the return pole 316, the magnetic flux also flows through the medium 332 to the trailing return pole 340.

With reference still to FIG. 3, it can be seen that the write pole 314 has a tapered upper surface 342 at a pole tip region near the ABS. This taper causes the write pole 314 to have a gradually reduced height and gradually reduced cross section as the write pole extends toward the ABS. This gradually reduced cross section advantageously concentrates the magnetic flux flowing into the tip of the write pole 314, without saturating the write pole 314. It has been found that this slanted configuration of the write pole 314 results in an improved ratio of magnetic write width (MWW) to magnetic core width (MCW). This tapered shape of the write pole 314 also provides a 2 db improvement in overwrite and a 5-10 percent improvement in field gradient.

Figure 4:
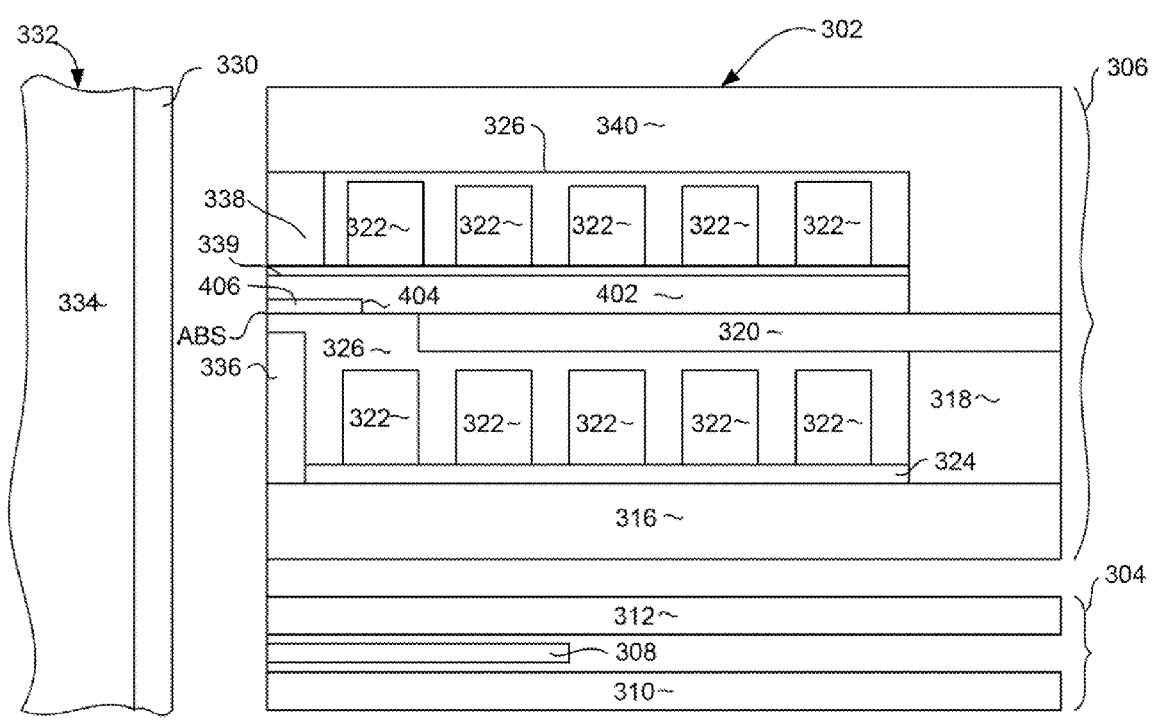
FIG. 4 is a cross sectional view of a magnetic head according to an alternate embodiment of the invention.

With reference now to FIG. 4, in another embodiment of the invention, the write head 306 has a write pole 402 that is stepped. As can be seen, as the write pole 402 extends toward the ABS, it is formed with a step 404, formed over a non-magnetic bump layer 406 that can be, for example alumina. The step 404 reduces the cross section of the write pole 402 as it extend toward the ABS, thereby channeling magnetic flux in a manner similar to that described above with reference to FIG. 3. This stepped shape of the write pole 402 also improves the MWW/MCW ration in a manner similar to that described above. The stepped shape of the write pole 402 also provides a 2 db improvement in overwrite and a 5-10 percent improvement in field gradient.

Figure 5:
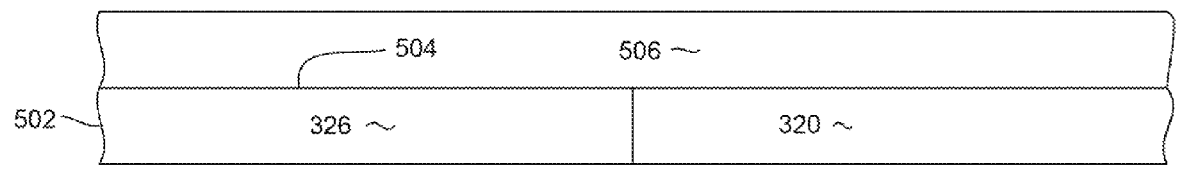
FIGS. 5-12 show a portion of a write head in various intermediate stages of manufacture, illustrating a method of manufacturing a write head according to an embodiment of the invention.

With reference now to FIGS. 5-12, a method is described for manufacturing a write head 302 and write pole 314, such as that described above with reference to FIG. 3. With particular reference to FIG. 5, a substrate 502 is provided, which preferably includes the insulation layer 326 and shaping layer 320 described above with reference to FIG. 3. The substrate preferably has an upper surface 504 that has been planarized, such as by chemical mechanical polishing. A magnetic layer 506 is then deposited over the substrate 502. This magnetic layer 506 can be, for example, CoFe and could be deposited to a thickness of 40-60 nm or about 50 nm. The magnetic layer 506 can be deposited by electroplating, but could also be deposited by a method such as sputter deposition.

Figure 6:
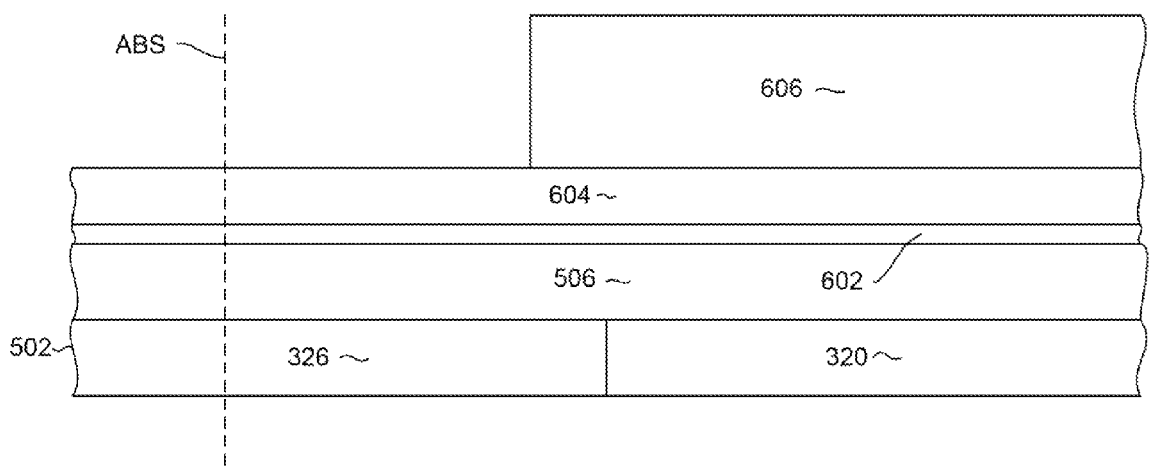

With reference now to FIG. 6, a layer of material that is resistant to chemical mechanical polishing (CMP stop layer) 602 is deposited over the magnetic layer 506. The CMP stop layer can be, for example, diamond like carbon (DLC). An image transfer layer 604 can then be deposited over the CMP stop layer 506. The image transfer layer 604 can be a soluble polyimide such as DURIMIDE®. A mask 606 is formed over the image transfer layer 604 and CMP stop 602. The mask 606 can be formed by depositing a layer of photoresist and then photolithographically patterning and developing the photoresist layer to form an edge 608 at a desired location relative to a desired air bearing surface plane (ABS). The ABS will be formed in a subsequent slicing and lapping operation.

Figure 7:
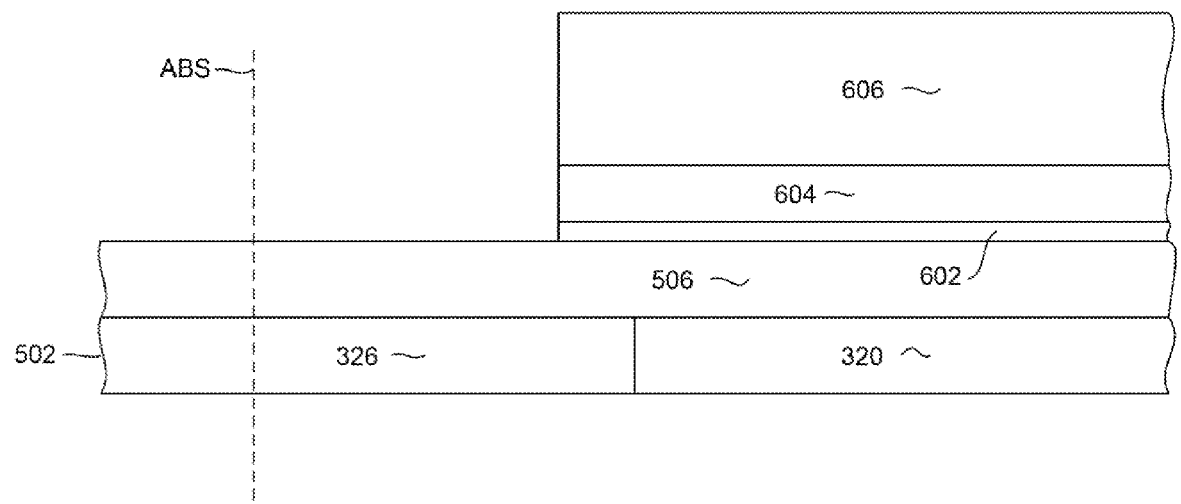
Figure 8:
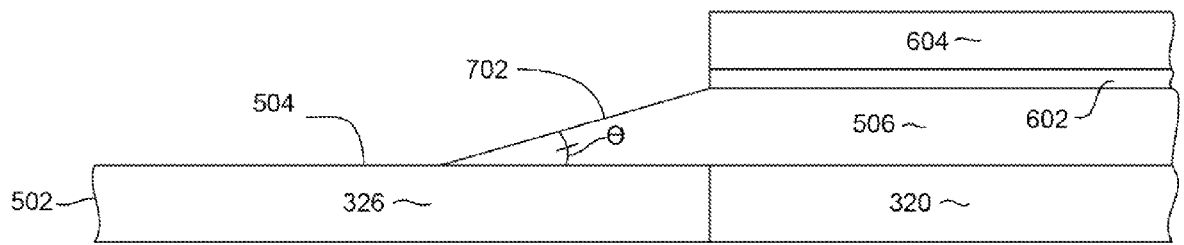

With reference now to FIG. 7, a reactive ion etching (RIE) is performed to remove portions of the image transfer layer 606, CMP stop layer 602 that are not protected by the mask 606 (FIG. 6), thereby transferring the image of the mask 602 onto the underlying layers 604, 602. Then, an ion milling is performed to remove portions of the magnetic layer 506 that are not protected by the layers 602, 604, 606, resulting in a structure as shown in FIG. 8. As can be seen in FIG. 8, the ion milling may remove the mask layer 606. However, the remaining portions of layers 602, 604 remain as mask layers for the ion milling process. The ion milling is performed at an angle relative to normal so that the magnetic material 506 is formed with a tapered surface 702, that preferably forms an angle □ of 3-10 degrees or about 6 degrees with respect to the surface 504 of the substrate 502. In order to form the tapered surface 702 with a desired amount of taper angle, the ion milling is preferably performed at an angle of 45-55 degrees or about 50 degrees with respect to normal.

Figure 9:
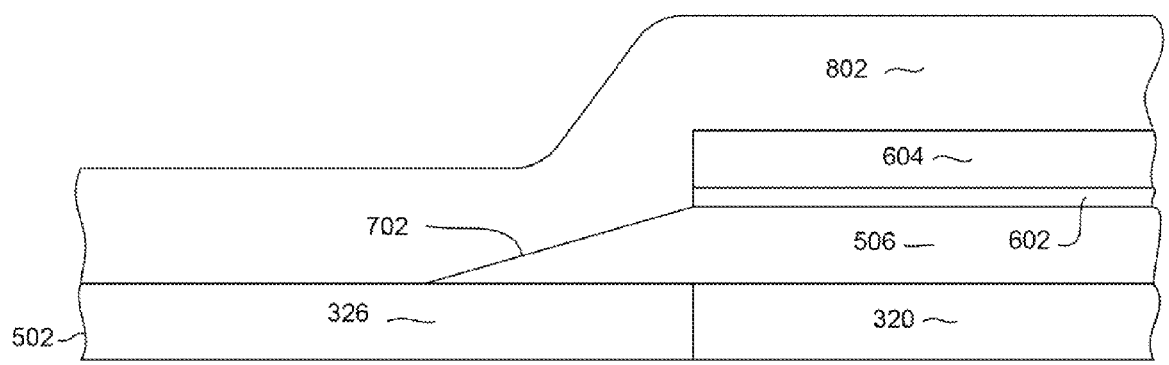

With reference now to FIG. 9, a fill layer 802 is deposited. The fill layer 802 is preferably a material that can be readily removed by reactive ion etching (RIE) and can therefore be referred to as a RIEable layer 802. The RIEable layer 802 can be constructed of, for example SiN or $SiO_2$, and can be deposited to a thickness of about the thickness of the magnetic layer 506 or slightly thicker (eg. about 50 nm.).

Figure 10:
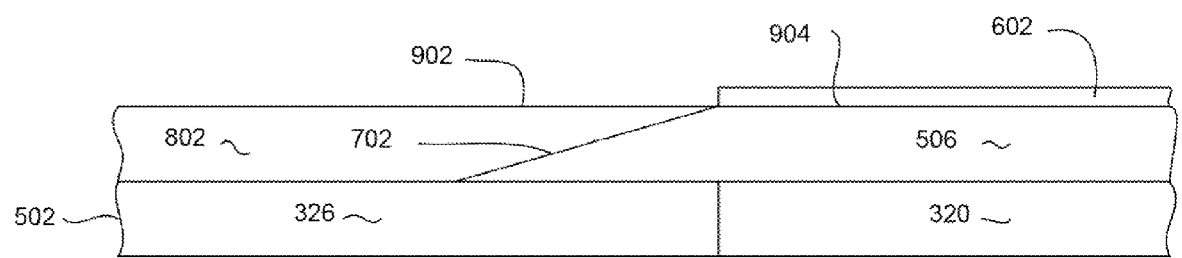
Figure 11:
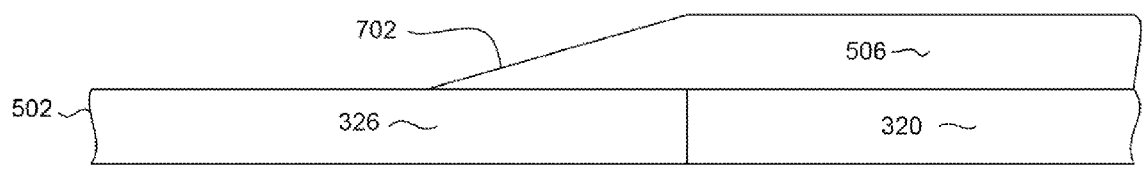

With reference to FIG. 10 a chemical mechanical polishing process (CMP) is performed, stopping at the CMP stop layer 602. This results in the fill layer 802 having an upper surface 902 that is substantially parallel with the upper surface 904 of the magnetic layer 506. Then, a reactive ion etching can be performed to remove the remaining fill layer 802 and CMP stop layer 904, resulting in a structure such as that shown in FIG. 11.

Figure 12:
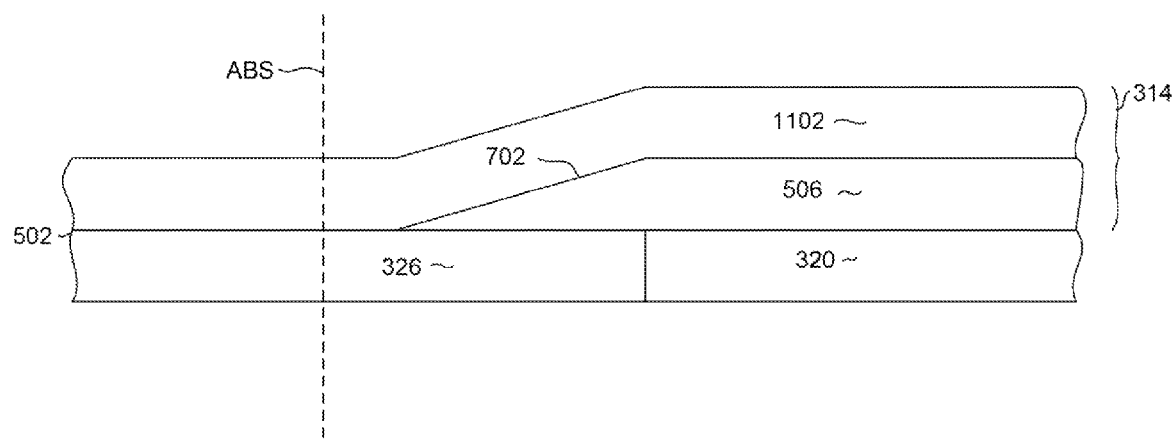

With reference now to FIG. 12, a second layer of magnetic material 1102 is deposited over the magnetic layer 506 and substrate 502. The magnetic layer 1102 is preferably deposited by plasma vapor laminate deposition (PVD laminate deposition). The first and second magnetic layers 506 and 1102, together form the tapered write pole 314 described above with reference to FIG. 3. The slanted surface 702 results in the write pole 314 having a sloping upper surface with a height that decreases as it extends toward an intended air bearing surface plane indicated by the dashed line denoted ABS.

After the write pole 314 has been formed, other remaining portions of the write head can be constructed by methods familiar to those skilled in the art. Those structures may include, for example, a trailing magnetic shield 338 upper coil portions 322 and return pole 340 describe above with reference to FIG. 3.

As those skilled in the art will recognize, the air bearing surface is formed by a lapping operation. Many thousands of magnetic head are formed on a single wafer. This wafer is sliced into rows of sliders, and a lapping operation is performed on the row of sliders to remove material from the left as shown in FIG. 12. This lapping operation is terminated when the dashed line indicated ABS is reached, thereby forming the air bearing surface denoted as ABS in FIG. 3.

Figure 13:
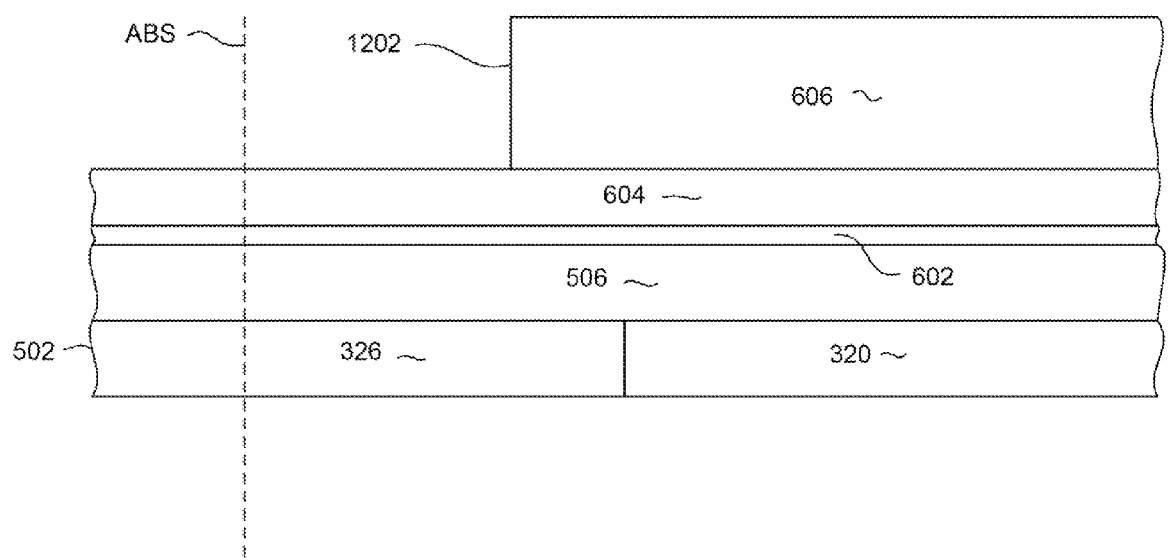
FIGS. 13-18 show a portion of a write head in various intermediate stages of manufacture, illustrating a method of manufacturing a write head according to an alternate embodiment of the invention.

With reference now to FIGS. 13-18 a method is described for constructing a stepped write pole 402 described above with reference to FIG. 3. With particular reference to FIG. 13, a structure is formed similar to that described above with reference to FIG. 6. With the presently described embodiment, it may be desirable to form a mask 606 having an edge 1202 that is located over the insulation layer portion 326 of the substrate. That is the edge is preferably formed in a plane that is between the edge 1204 of the magnetic shaping layer 320 and the ABS plane.

Figure 14:
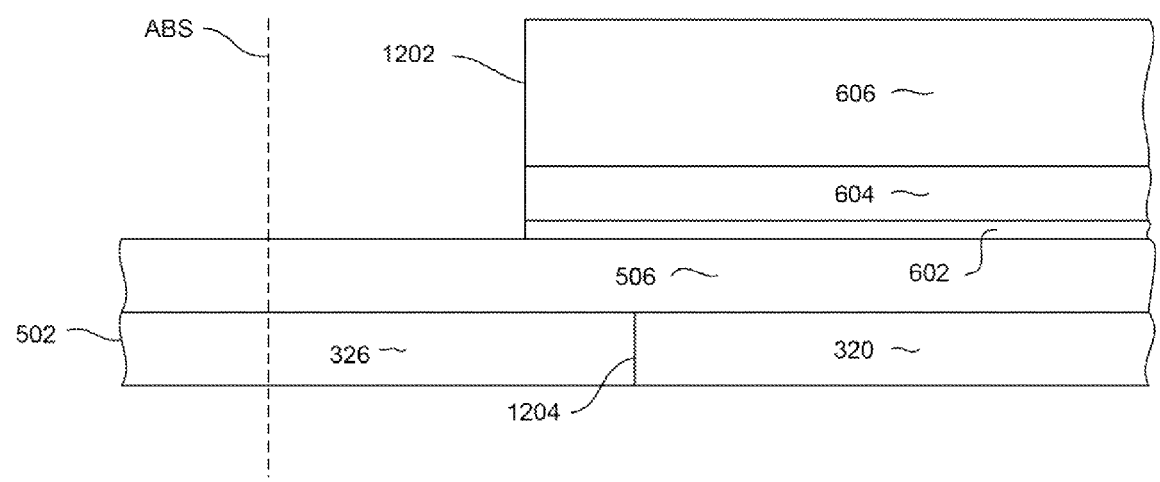
Figure 15:
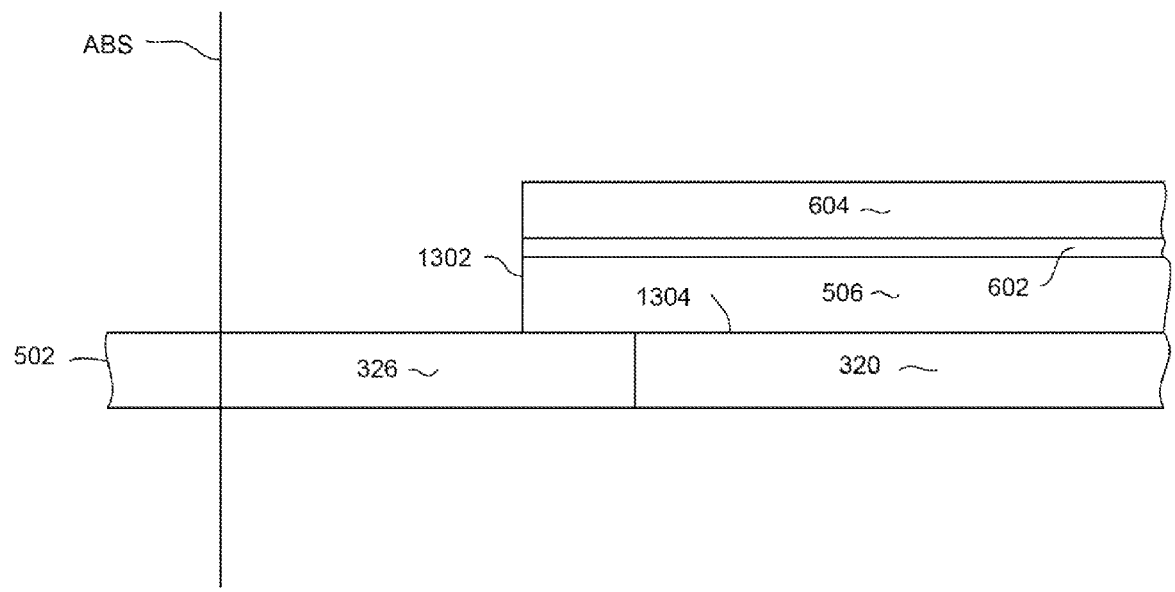

With reference now to FIG. 14, a reactive ion etching (RIE) is performed to remove portions of the image transfer layer 604 and CMP stop layer 602 that are not protected by the mask 606, thereby transferring the image of the mask 606 onto the underlying layers 602, 604. Then, an ion milling operation is performed to remove portions of the magnetic layer 506 that are not protected by the mask 606. The mask 606 may be removed by the ion milling resulting in a structure as shown in FIG. 15. In the presently described embodiment the ion milling process is performed so as to form a substantially vertical edge 1302 on the magnetic layer 506. This can be achieved by performing the ion milling at an angle ~10 to 30 degree relative to normal.

Figure 16:
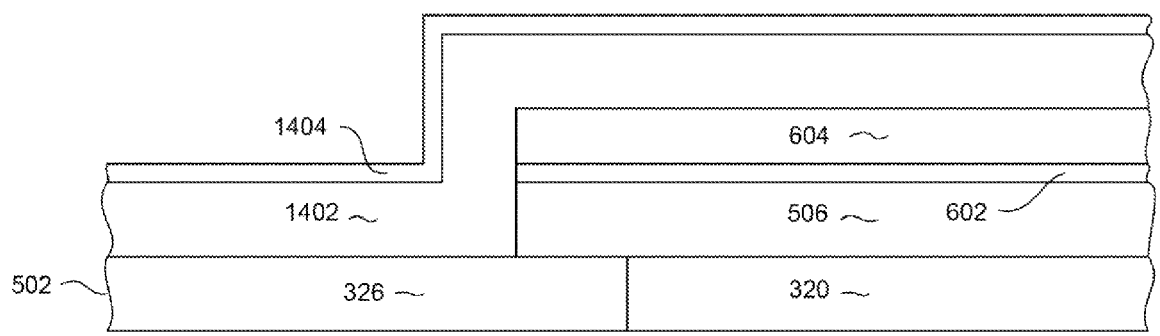

With reference now to FIG. 16, a non-magnetic fill layer 1402 such as alumina ($Al_2O_3$) is deposited followed by a second thin layer of material that is resistant to chemical mechanical polishing (second CMP stop layer 1402). The fill layer 1402 can be deposited to about the thickness of the first magnetic layer (e.g. about 50 nm). The second CMP stop layer 1404 can be, for example diamond like carbon (DLC).

Figure 17:
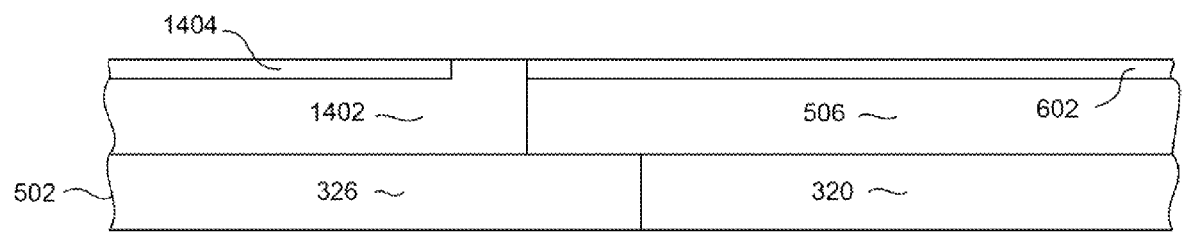
Figure 18:
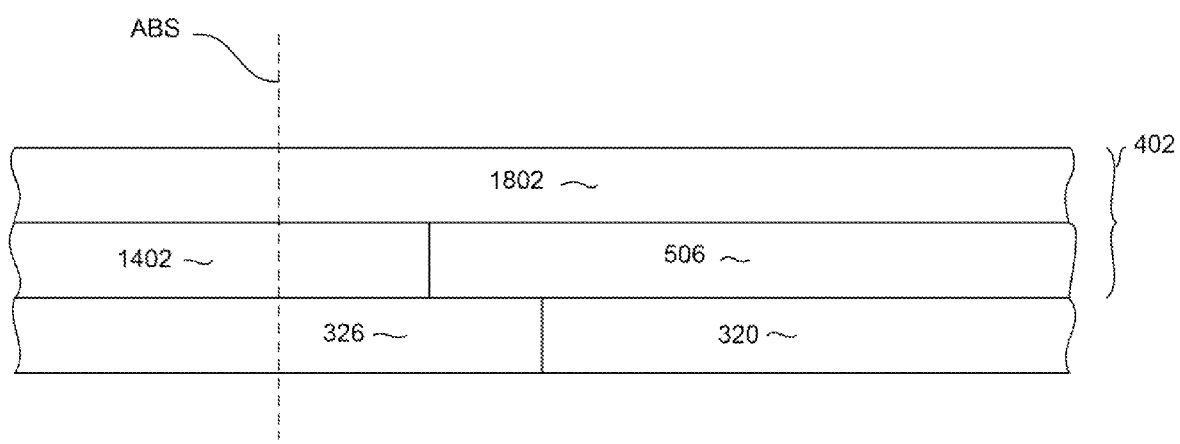

Then, a chemical mechanical polishing process (CMP) can be performed stopping at the CMP stop layers 602, 1404, resulting in a structure such as that shown in FIG. 17. Another reactive ion etching, (RIE) can then be performed to remove the remaining CMP stop layers 602, 1404. A second layer of magnetic material 1802 can then be deposited, leaving a structure such as that shown in FIG. 18. As can be seen then, the layers 506 and 1802 together form the stepped write pole structure 402 described with reference to FIG. 4. The air bearing surface ABS will subsequently be formed by a lapping operation as described above.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetic write head, comprising:
   providing a substrate;
   depositing a first magnetic layer over the substrate;
   depositing a layer of material that is resistant to removal by chemical mechanical polishing (CMP stop layer);
   forming a mask structure over the CMP stop layer;
   performing an ion milling to remove a portion of the first layer of magnetic material that is not protected by the mask structure, the ion milling being performed in a manner to form a tapered upper surface on the first magnetic layer;
   depositing a layer of material that can be readily removed by reactive ion etching (RIEable material);
   performing a chemical mechanical polishing;
   performing a reactive ion etching to remove remaining RIEable material; and
   depositing a second layer of magnetic material onto the first magnetic material.

2. The method as in claim 1 wherein the CMP stop layer comprises diamond like carbon (DLC).

3. The method as in claim 1 further wherein the reactive ion etching removes remaining portions of the CMP stop layer.

4. The method as in claim 1 further comprising, depositing an image transfer layer between the mask structure and the CMP stop layer.

5. The method as in claim 4 further comprising performing an ion milling to transfer the image of the mask structure onto the underlying image transfer layer and CMP stop layer.

6. The method as in claim 4 wherein the image transfer layer comprises a soluble polyimide.

7. The method as in claim 1 wherein the substrate has a surface defining a plane, and wherein the ion milling is performed at an angle relative to the plane defined by the surface of the substrate.

8. The method as in claim 1 wherein the substrate has a surface defining a plane and wherein the ion milling is performed at an angle of 45 to 50 degrees relative to the plane defined by the surface of the substrate.

9. The method as in claim 1 wherein the substrate has a surface, and wherein the ion milling is performed in a manner so that the tapered surface of the magnetic layer defines an angle of 3-10 degrees with respect to the surface of the substrate.

10. The method as in claim 1 wherein the substrate has a surface, and wherein the ion milling is performed in a manner so that the tapered surface of the magnetic layer defines an angle of about 6 degrees with respect to the surface of the substrate.

11. The method as in claim 1 wherein the RIEable material comprises SiN or $SiO_2$.

12. The method as in claim 1 wherein the mask structure comprises a photolithographically patterned photoresist.

13. The method as in claim 1 wherein the RIEable material is deposited to a thickness that is substantially equal to a thickness of the first magnetic layer.

14. The method as in claim 1 wherein the chemical mechanical polishing process is performed until the CMP stop layer has been reached.

15. A method for manufacturing a magnetic write head, comprising:
   providing a substrate;
   depositing a first magnetic layer over the substrate;
   depositing a layer of material that is resistant to removal by chemical mechanical polishing (CMP stop layer);
   forming a mask structure over the CMP stop layer;
   performing an ion milling to remove a portion of the first layer of magnetic material that is not protected by the mask structure, the ion milling being performed in a manner to form a tapered surface on the first magnetic layer,
   depositing a layer of material that can be readily removed by reactive ion etching (RIEable material)
   performing a chemical mechanical polishing;
   performing a reactive ion etching to remove remaining RIEable material; and
   depositing a second layer of magnetic material over the first magnetic material;
   wherein the deposition of the second magnetic layer comprises plasma vapor laminate deposition.

16. A method for manufacturing a magnetic write head, comprising:
   providing a substrate;
   depositing a first magnetic layer over the substrate;
   depositing a first layer of material that is resistant to chemical mechanical polishing (first CMP stop layer) over the first magnetic layer;
   depositing an image transfer layer over the first CMP stop layer;
   forming a mask structure over the image transfer layer, the mask structure having an edge located a desired distance from an intended air bearing surface plane;
   performing a reactive ion etching to remove portions of the image transfer layer and first CMP stop layer that are not protected by the mask structure, thereby transferring the image of the mask structure onto the underlying image transfer layer and first CMP stop layer;
   performing an ion milling to remove portions of the magnetic layer that are not protected by the CMP stop layer and image transfer layer;
   after performing the ion milling, depositing a layer non-magnetic fill material;

after depositing the non-magnetic fill material, depositing a second layer of material that is resistant to chemical mechanical polishing (second CMP stop layer);
performing a chemical mechanical polishing process; and
depositing a second layer of magnetic material.

17. The method as in claim 16, further comprising, after performing the chemical mechanical polishing and before depositing the second magnetic layer, performing a second reactive ion etching to remove the first and second CMP stop layers.

18. The method as in claim 16 wherein the ion milling is performed in a manner so as to form a substantially vertical edge on the first magnetic layer.

19. The method as in claim 16, wherein the substrate has a surface and wherein the ion milling is performed at an angle that is substantially normal to the surface of the substrate.

20. A method as in claim 16 wherein the non-magnetic fill layer comprises alumina.

21. A method as in claim 16 wherein the non-magnetic fill layer is deposited to a thickness that is substantially equal to a thickness of the first magnetic layer.

22. A method as in claim 16 wherein the substrate includes a magnetic shaping layer and a non-magnetic insulation layer.

* * * * *